United States Patent [19]

Grodek

[11] 3,986,851
[45] Oct. 19, 1976

[54] FILTER OF POLYTETRAFLUOROETHYLENE FIBERS

[75] Inventor: Raymond J. Grodek, Seven Hills, Ohio

[73] Assignee: The Harshaw Chemical Company, Cleveland, Ohio

[22] Filed: June 23, 1975

[21] Appl. No.: 589,164

[52] U.S. Cl. .................................. 55/488; 55/97; 55/528; 55/DIG. 5; 55/DIG. 16
[51] Int. Cl.² ........................................ B01D 39/16
[58] Field of Search ............... 55/97, 486, 487, 488, 55/489, 528, DIG. 16, 527, DIG. 5; 28/DIG. 1; 427/244

[56] References Cited
UNITED STATES PATENTS

| 2,578,523 | 12/1951 | Nuteley | 28/DIG. 1 |
|---|---|---|---|
| 2,689,199 | 9/1954 | Pesce | 428/227 |
| 2,893,105 | 7/1959 | Lauterbach | 28/76 R |
| 2,933,154 | 4/1960 | Lauterbauch | 55/486 |
| 3,056,247 | 10/1962 | Pindzola et al. | 55/488 X |
| 3,353,982 | 11/1967 | Blaha | 427/244 X |
| 3,455,792 | 7/1969 | Ohta | 55/528 X |

Primary Examiner—Frank W. Lutter
Assistant Examiner—David L. Lacey
Attorney, Agent, or Firm—Alfred D. Lobo

[57] ABSTRACT

A filter element for aerosols and finely divided solid particles suspended in a gas, is formed by depositing a septum of microscopic and submicroscopic unsintered fibers of fibrillatable polytetrafluoroethylene (hereinafter referred to as PTFE) as a random network on a supporting screen. The filter so formed is especially effective to remove liquid and solid particles of micron and submicron size suspended in a gaseous medium to be filtered.

A process is described for separating contaminant solid and liquid particles less than about 5 $\mu$ (micron) in diameter from the gas in which the particles are suspended, comprising introducing primary particles of fibrillatable PTFE less than about 1 $\mu$ in diameter, into a flowing gas in which the contaminant particles are suspended, maintaining the gas at a temperature above the fibrillation temperature but below the sinter temperature of PTFE, for a time sufficient to form fibers of PTFE, depositing a random network of PTFE fibers upon a gas-permeable support means to form a septum of PTFE fibers sufficient to ensnare the contaminant particles, and recovering the gas substantially free of the contaminant particles. In another embodiment of the process, the filter element described is preformed. The gas in which the solid or liquid contaminant particles is suspended (hereinafter referred to as a dispersoid) is flowed through one or more filter elements and the purified gas substantially free of contaminant particles is removed.

5 Claims, No Drawings

FILTER OF POLYTETRAFLUOROETHYLENE FIBERS

BACKGROUND OF THE INVENTION

Finely divided solid particles, and/or very small droplets of liquids in a gas (dispersoids) are conventionally separated from the gas in which they are suspended by passing the dispersoid through a batt or septum of woven or nonwoven fabrics of natural or synthetic fibers. Hereinafter, for clarity, the term batt is used to describe a mass of conventional fibers and the term septum is used to refer to a masss of unsintered fibers formed from solid primary particles of PTFE or from agglomerates of primary PTFE particles. Separation of particles larger than about 5 $\mu$ (referred to as relatively large particles) may be efficiently accomplished by conventional filter elements but these filter elements are insufficiently effective for the removal of less than 5 $\mu$ and submicron size particles of a dispersoid, for several reasons.

It is well-known that, even with an acceptable initial pressure drop, a conventional batt for the separation of less than 5 $\mu$ and submicron particles is rapidly plugged and the pressure drop soon becomes intolerable. Heretofore attempts have been made to use electrostatic materials in an air filter, as for example in the aforementioned non-woven fabrics, but these fibers are difficult to distribute evenly, must necessarily be deposited in a batt of considerable thickness and density to be effective with submicron size particles, and therefore, in a filter of this type, air flow is uneven and channeled. Often, as in a batt of non-electrostatic fibers, a batt of electrostatic fibers becomes quickly unusable because the desired air flow cannot be obtained due to severe matting of the fibers, and not because the batt is overloaded with filtered particles. Because, with unsatisfactory gas flow through a batt, separation of very small particles is of no practical significance, dense batts of known very fine fibers have very limited utility and are largely ineffective. Morever, for the separation of many chemicals, known batts are insufficiently inert to either a corrosive gaseous medium or to corrosive particles suspended in a noncorrosive gaseous medium, particularly when separation is to be effected at elevated temperatures.

It is also known that, according to theoretical considerations in filtration, the particle size most difficult to filter is about 0.25 micron or smaller, for perfectly spherical particles. With increasing size, the increasing inertia of the particle acts to cause the particle to impinge on a fiber of the filter medium. With decreasing size, the amplitude of the Brownian oscillation increases and acts to bring the particle more easily into contact with a fiber of the filter. According to this theory, once a submicron particle comes into contact with a fiber it is removed from the gaseous medium being filtered. This is true only if the area of contact between the fiber and particle is sufficiently large to offer enough attractive forces to overcome the inertia of the particle. Conventional non-woven fabrics are incapable of providing a sufficiently large contact area and are therefore insufficiently effective. However, the fibers of fibrillatable PTFE randomly deposited generally horizontally, one overlapping and intertwining another so as to be overlaid on a support, are surprisingly effective to provide a sufficiently large contact area and are therefore efficient filters especially for submicron size particles.

In particular, it is known that glass fibers and fibers of various polyolefinic resins are effective in the form of a batt or woolly mass to remove liquid or solid particles where the particles are relatively large in size, in the range from about 5 $\mu$ to about 100 $\mu$. For example, a batt of very fine glass fibers may be confined between parallel spaced apart screens, each glass fiber having a diameter in excess of about 10 $\mu$. For another example, where a fabric of polytetrafluoroethylene fibers supported on a wire meshs screen is used, the fibers are spun with predetermined uniform diameters in excess of about 50 $\mu$ and then sintered, and the sintered fibers are relatively coarse, being several times the diameter of unsintered fibers of PTFE.

Thus there are presently few available filtering media which are effective in removing submicron size particles; still fewer are able to remove contaminant submicron particles while maintaining sufficient permeability to gas flowing at a relatively rapid rate. Most synthetic fibers become wet with aerosols or liquid-containing smokes, are easily channelled and matted, or liquid particles tend to coalesce and tend to plug the filter. Only polyfluoroolefin fibers are able to withstand prolonged exposure to corrosive liquid-type smokes or aerosols at a temperature in the range from about 200°C to about 300°C. without soon becoming ineffective.

SUMMARY OF THE INVENTION

It has been discovered that a highly desirable non-woven filter may be formed by depositing fibers, formed from fibrillatablle polytetrafluoroethylene (PTFE) from a fluid medium on to a supporting means such as a finely woven screen or other foraminous support through which gas can flow.

It is therefore a general object of this invention to provide a filter for micron size dispersoid particles less than about 5 $\mu$ (microns) in diameter, and submicron size particles as small as about 0.01 $\mu$ in diameter, comprising a support means on which a random network of microscopic and submicroscopic fibers of fibrillatable PTFE are deposited in random drop-coated profusion to provide a septum of sufficient thickness to ensnare the particles, thus separating the particles from the gaseous medium in which they are suspended.

It is also a general object of this invention to provide a septum of unsintered fibers of PTFE formed from fibrillatable primary particles of submicron diameter which septum is deposited on a gas-permeable support means to provide a filter element for submicron and micron size dispersoid particles; the filter element has a low pressure drop initially, and suprisingly, the pressure drop does not increase substantially even after prolonged use.

It is a specific object of this invention to provide a supported septum of unsintered fibers of fibrillatable PTFE primary particles less than 0.5 $\mu$ (micron) in diameter, which fibers have a diameter in the range from about 0.01 $\mu$ to less than 0.5 $\mu$, are of arbitrary length and have high affinity for submicron and micron size solid or liquid dispersoid particles.

Also, a process has been discovered for forming a septum of a random network of submicron fibers of PTFE by fibrillating finely divided solid particles of fibrillatable PTFE in a fluid medium, at a temperature above the transition temperature of which fibers of PTFE are formed, but below the transition temperature required to sinter the PTFE, and randomly depositing the fibers of PTFE onto a gas-permeable support.

Further, an effective process has been discovered for separating solid dispersoid particles from the gas in which the particles are dispersed, comprising injecting submicron size primary particles of PTFE into the gas, causing the particles of PTFE to be worked into fibers of arbitrary length, contactng the fibers of PTFE with the solid particles and depositing the fibers of PTFE in random overlying inter-relationship on a supporting medium which is permeable to the gas to be cleansed.

It is a specific object of this invention to provide a filter for the removal of toxic or otherwise deleterious submicron and micron size dispersoid particles from gaseous media such as smoke, sprays or fogs generated in industrial processes, which gaseous media are to be purified for the benefit of humans.

It is also a specific object of this invention to provide a process for separating radioactive particles from a gaseous effluent by passing the effluent through a septum of randomly overlaid and intertwined unsintered fibers of fibrillatable PTFE deposited on a gas permeable support, at an effluent pressure in the range from about atmospheric to about 10 atm. pressure, and at a gas velocity in excess of 0.1 ft./sec. and preferably in the range from about 1 ft./sec. to about 10 ft./sec.

These and other objects, features and advantages of this filter, the process for making the filter, and the process for filtering a dispersoid in a gas with the filter, will become apparent to those skilled in the art from the following description of preferred forms thereof and the illustrative examples set forth herein.

DETAILED DESCRIPTION OF PREFERRED EMBODIMENTS OF THE INVENTION

According to this invention a septum of microscopic and submicroscopic unsintered PTFE fibers having a diameter of less than 1 $\mu$ (micron) serves as a superfine filter which may be deposited on any fluid permeable support means to separate submicron size particles from the fluid in which they are carried.

The septum of this invention is formed only from fibrillatable polytetrafluoroethylene resin (hereinafter "PTFE") produced in the form of finely divided, solid particles commercially available as a colloidal aqueous dispersion or suspensoid concentrated to about 60% by weight of polymer having primary particles about 0.05 $\mu$ to about 0.5 $\mu$ in size, with average diameter of about 0.2 $\mu$. The aqueous dispersion of PTFE particles is also referred to in the art as an aqueous dispersoid, but for the sake of clarity, to distinguish between contaminants to be filtered from a gaseous dispersoid in which they are carried, in this specification the aqueous dispersion of PTFE will be referred to as a suspensoid and the gaseous medium in which contaminant particles, whether solid or liquid, are carried, will be referred to simply as a dispersoid. THe particles in a suspensoid of such PTFE particles are particularly well-suited to being transformed into very long and very fine fibers of PTFE by being subjected to a working action at a temperature above about 20°C but below a temperature at which the PTFE is sintered, that is, its transition temperature.

The fibrillable PTFE polymer used in the process of this invention includes the high molecular weight polytetrafluoroethylene resins produced by emulsion polymerization. These PTFE polymers have a broad molecular weight range of about 10 to 20 million and are commercially available products. The preparation of these polymers, which are described in U.S. Pat. No. 2,510,112; U.S. Pat. No. 2,559,752; U.S. Pat. No. 2,587,357 and U.S. Pat. No. 2,685,707 involves well-known emulsion polymerization techniques wherein tetrafluoroethylene under pressure in water containing an emulfisying agent, is reacted with a water soluble free radical catalyst. The emulsion produced is coagulated, washed and then dried. The average agglomerate size of the polymer is about 50 to 560 microns though the primary particle size is in the range less than 1 micron; polymer having larger or smaller average agglomerate size is operative. THe PTFE used to make the non-woven septum of fibrils is commercially available from E. I. duPont deNemours & Company, Wilmington, De., as Teflon* T-6, T-30, T-42, K-10, K-20, etc., and from Imperial Chemical Industries as Fluon** GP-1, GP-2, CD-014, CD-142, etc.

*Registered Trademark of duPont de Nemours **Registered Trademark of ICI

The fibrillatable PTFE primary particles formed as described in the prior art are primary particles generally less than 1 $\mu$ in diameter, and their peculiar propensity for fiber formation has been noted or utilized in U.S. Pat. Nos. 2,559,752; 3,301,807; 3,698,392; 3,838,064; 3,838,092; and 3,864,124. The ease with which fiber formation of PTFE takes place, such as is desirable for the instant invention, is greatly affected by numerous factors including the physical characteristics of the fluid medium in which the particles are suspended, the turbulence of the medium, the temperature of the medium, and the residence time of PTFE particles in the fluid medium.

In a specific and very simple embodiment of this invention a suspensoid of fibrillatable PTFE particles is introduced into a stack gas or other gaseous effluent stream at an elevated temperature, above the transition temperature for fibrillation or fiber formation, but below the transition temperature for sintering or "sinter temperature", of PTFE. This transition temperature for fibrillation, or "fibrillation" temperature is not the same for the various forms of fibrillatable PTFE available, just as the sinter temperature is not identical for all forms. In general, the fibrillation temperature is about 20°C and the sinter temperature is about 300°C. A preferred stack gas temperature is in the range from about 50°C to about 250°C.

The flow characteristics of the stack gas should be sufficient to fibrillate the particles of PTFE. It is preferred that the stack gas glow be turbulent, but at sufficiently elevated temperature and enough residence time, laminar flow is effective to produce fibrillation of the PTFE particles. The stack gas is then filtered through any conventional filter medium upon which the PTFE fibers are deposited and which is thus coated with a septum of the PTFE fibers. Eventually, a sufficiently large mass of microscopic and submicroscopic PTFE fibers is deposited to build up a septum of a random network of intertwined fibers through which submicron contaminant particles carried in the stack gas cannot pass. When the desired filtration of the contaminant particles is obtained on the septum, introduction of the PTFE particles into the stack gas may be discontinued, or continued at a much reduced rate.

The submicron particles which would otherwise have passed through a conventional filter means are thus effectively trapped in the deposited septum of deposited PTFE fibers in combination with the conventional filter means. From a practical point of view it is preferred to remove relatively large contaminant particles, greater than about 5 μ in diameter by any conventional mans, and then practice the above-described injection of a PTFE suspensoid into the preliminarily cleansed gases, so as to constitute a finishing or polishing step.

The amount of PTFE particles introduced into the stack gas is not critical and can be arrived at with a minimum of experimentation. The amount of PTFE particles used initially may be relatively large up to about 10 percent by weight, based on the total solids content of the gaseous stream. Gradually, as the fibers of PTFE build up as a septum on, say, a conventional stainless steel wool filter, the amount of PRFE may be reduced to about 1 percent by weight, based on total solids to be removed, or even less.

The suspensoid of PTFE as injected into the gas stream contains generally spherical submicron primary particles of PTFE. These particles are fibrillated by a working action which may be described as a combination of a gentle shearing action and compacting action. If the turbulence of the gaseous stream is insufficient to impart the required working action to form long fibers, it may be necessary to lead the gases through a tortuous course in a gas chamber so that the primary particles are rubbed against the walls of the gas chamber, and against solid contaminant particles, sufficiently to effect the desired fibrillation.

Clearly fibrillation of the unsintered PTFE particles is critical to the formation of the septum of unsintered fibers and to the removal of the contaminant particles, but the precise extent of fibrillation is not. The degree of fibrillation effected may be assessed by the examination of the conventional filter means on which the septum of PTFE fibers is deposited. This examination is preferably done with a high power microscope, such as an electron microscope. The deposition of a major proportion of ellipsoidal or otherwise only slightly elongated primary particles indicates insufficient fibrillation. As far as can be determined, it is not possible to determine the precise length to which individual particles are preferably fibrillated, but the length is at least 10 times the diameter of the particle. It can also be stated that it does not appear possible to fibrillate all the primary particles to so great an extent as to render ineffective the septum of PTFE fibers formed on the conventional filter.

As indicated, it is convenient to effect fibrillation of the PTFE particles, in situ, in the dispersoid containing contaminant particles. However, to be effective, the temperature of the dispersoid should be above about 20°C to allow fiber formation, but below the sintering temperature of PTFE, or a temperature deleterious to the contaminant particles to be separated, whichever temperature is lower. By a temperature deleterious to the contaminant particles I refer to a temperature at which the solid contaminants will decompose into particles less than about 0.01 μ in diameter, or at which liquid particles in the dispersoid are vaporized into droplets which are less than about 0.01 μ in diameter. In no event is the temperature permitted to reach the sintering temperature of the PTFE, for sintered fibers of PTFE are wholly ineffective for the purposes of this invention.

Also, though the gas velocity through the conventional filter means is not critical, it is clear that the gas velocity should not be permitted to reach a level sufficient to rupture or damage the septum of fibers deposited on the filter support means. A preferred operational range of gas velocity is high enough to effect fibrillation of the PTFE particles, but low enough not to disrupt the septum of fibers, so that the septum ensnares the contaminant particles. In general the gas velocity will be in the range from about 1 ft./sec. to about 10 ft./sec. As will be recognized, the gas velocity through a batt of steel wool, polyolefin fibers or glass fibers, is relatively low and well-suited for a finishing operation with PTFE fibers. Such a batt is conventionally used to trap fine particles, bacteria and the like.

Where for example, stainless steel wool is used, the fibers of PTFE are deposited upon contact with the steel wool fibers, soon after the gas stream enters the steel wool, forming a loose network of PTFE fibers which are interlaced randomly with one another and with the steel wool fibers. This combination of PTFE septum with a batt of steel wool provides an unexpectedly effective filter means which has durability, resistance to channelling, a low pressure drop and surprising effectiveness. Commonly available fibers used to form a filter batt have diameters in the range from about 100 μ to about 0.010 in. and are several orders of magnitude greater than the average diameter of a PTFE fiber; it is therefore essential, for removal of fine particles commonly in the range from about 0.1 μ to about 5 μ, that the septum of PTFE fibers be supported on the fibrous batt to provide a durable filter.

Clearly, though a stainless steel wool filter and a batt of polyolefin or glass fibers are described as a gas permeable support means upon which the septum of PTFE fibers is deposited, any other foraminous gas permeable support means may be used, which is capable of supporting a random network of submicron diameter PTFE fibers. For example, porous ceramic or glass frit bodies collectively referred to generally as ceramic open-pore filters, may be used as a support means, as may be porous sintered metal bodies such as porous sparger plates. Most preferred is a gas-permeable batt of any suitable non-woven polymeric resin, a mass of wooly fibers, or a woven screen made of material which is unreactive both with the gas to be filtered and the contaminant particles to be removed therefrom.

Instead of forming PTFE fibers, in situ, in the gas stream to be filtered, it may be desirable to fibrillate the PTFE particles in another fluid medium and to deposit the fibers so formed on a gas permeable support means to form a septum prior to commencing filtration. For example, a colloidal aqueous dispersion of PTFE particles in a concentration in the range from about 10 to about 30 percent by weight may be fibrillated in a liquid medium by any conventional means, as for example, with a high-speed high shear blender at a temperature above about 20°C and preferably below about 100°C to get rapid fiber formation. The concentration of PTFE in the liquid is not critical, but it will be appreciated that, with very low concentrations less than 1% by weight, fiber formation is slow; on the other hand, with very high concentrations, fiber formation is so extensive that it is difficult to deposit a septum with desirable characteristics on a gas permeable support means. In the concentration range stated, namely 10 to 30 percent by weight, good fiber formation is effected and the fibers may be conveniently deposited with random orientation on a support means, simply by filtering the liquid through the support means. For example, liquid containing fibrillated PTFE primary particles may be filtered through a relatively coarse screen, say 200 U.S. Standard mesh, and the filtered liquid may be further mixed and sheared to fibrillate particles which pass through the screen.

The degree of fibrillation, that is the number of fibers formed and the length of individual fibers, will depend upon the physical characteristics of the fluid in which the PTFE particles are worked, the amount of PTFE used, the type of mixer used to effect dispersion, the intensity of the mixing action, the temperature at which the mixing is carried out, and the length of time over which it is effected. Though fibers are conveniently formed in a liquid medium they may also be formed in a highly turbulent air stream in a device such as a Micronizer[R] air mill. Other devices may be used wherein the PTFE particles are suspended in a gaseous stream which is then flowed at relatively high velocity against suitable surfaces to enhance the ease with which fibers are formed. For example, in a particular device, a coiled conduit may be heated to an elevated temperature substantially above the sinter temperature of the PTFE particles, and a gas stream containing the PTFE particles may be flowed through the conduit at a sufficiently high velocity to effect fibrillation of the PTFE particles without their having reached the sintering temperature.

As stated hereinabove the fiber formation is conveniently effected in a liquid medium. Most commonly water is used, but any liquid may be used which is essentially unreactive with, or not a solvent for, the PTFE particles. Preferred liquids are those which can be easily separated from the fibers formed. Such liquids include the primary alcohols, particularly the lower alcohols having from 1 to about 8 carbon atoms, ketones and glycols, particularly those having less than about 15 carbon atoms, silicones, liquid polyhalocarbons and liquid hydrocarbons such as mineral spirits and the like. Most preferred are those liquids which minimize balling up or adhesion of fibers formed.

Irrespective of the particular fluid medium in which the fibers of PTFE are formed, they are deposited in a random network of microscopic and submicroscopic fibers on a gas-permeable support means. To filter very fine dispersoid particles from a gas, enough fibers are deposited to form a septum which is essentially impermeable to water but permeable to gas flow. By impermeable to water is meant that a septum of PTFE fibers deposited on a screen will support a film of water. The denser the septum the more impervious it will be to water, that is, it can support a greater hydrostatic head. For most gas filtration applications it is not essential that the septum of fibers be liquid impervious. Particularly where the septum of PTFE fibers is deposited on a fibrous batt such as steel wool, it is sufficient to form only so much of a septum as is necessary to ensnare the particles to be separated from the gas. Where the septum of PTFE fibers is deposited on a screen, several graded densities of septa may be used, each density on a separate screen, and plural screens may be used in series. The density of each PTFE septum is chosen to effect the desired separation of particles in a predetermined size range. An effective density of a septum is arrived at by simple experimentation.

Another type of fibrillatable PTFE, generally referred to as dry "fine powder," obtained by coagulation of the dispersed primary particles in the aqueous suspensoid, is less effective than the suspensoid because of the greater difficulty of fibrillating the coagulated particles. In the commercially available form of fine powder, the suspensoid is treated to form agglomerates with average diameters of about 450 $\mu$. Specific surface areas of these fine powders are on the order of 10–12 $m^2/g$, with an average apparent powder density of 475 g/liter. Still another type of fibrillatable PTFE, generally referred to as "paste polymer", may be used. This PTFE paste polymer is obtained by coagulation of dispersed primary particles in an aqueous suspensoid, in much the same manner as the coagulation for producing fine powder, except, of course, the coagulation is not dried. These types of resin and their manufacture are more fully described in U.S. Pat. Nos. 2,510,112 and 2,559,752. As will be explained hereinafter, such coagulated particles may be worked if desired, preferably in a fluid medium, until sufficient fiber generation is effected.

It is especially noteworthy that the most common dry form of PTFE is unfibrillatable, granular molding powder which is ineffective for the purposes of this invention. Similarly other carbonaceous polymers such as other polyhalocarbons and polyolefins, silicones and modifications thereof are ineffective in producing submicron diameter fibers when they are subjected to a working action.

The following examples are by way of illustration only, and this invention is not limited to the particular embodiments illustrated.

EXAMPLE 1

An aqueous suspensoid of PTFE resin commercially available as Teflon[R] T-30* which contains about 60 percent by weight resin having a primary particle size in the range from about 0.05 $\mu$ to about 0.5 $\mu$ and an average particle size of about 0.2 $\mu$ is used in the following manner:

*Trademark of E. I. duPont de Nemours & Co. (Inc.), material described in Bulletin No. X-50f inter alia.

500 ml. of T-30 Teflon aqueous suspensoid are added slowly to 1 liter of distilled water heated to about 50°C and the diluted suspensoid is heated to maintain this temperature. The diluted suspensoid is then poured into a Waring blender of the high speed and high spear type and subjected to a vigorous mixing action for about 10 minutes. The precise time of mixing is not critical but should be sufficient to form a large number of fibers from the primary particles of PTFE.

A circular section of a 325 mesh screen is placed in a conical funnel so as to support the screen at its periphery. The diluted suspensoid is poured through the screen, the liquid is collected and again poured through the screen. This procedure of pouring the liquid through the screen is repeated numerous times, if necessary, until flow of the liquid through the screen is very slow. The screen is removed from the conical funnel and dried in an oven at about 120°C.

The screen is examined under a high power microscope and it is seen that the screen is covered with a septum of a random network of very fine fibers of PTFE resin. This septum of fibers is recognizable to the naked eye as a cloudy film when the screen on which the septum is supported is held up to a light source. Individual fibers are not visible, and there is no unaided visual indication that a septum of fibers has been formed. The septum of fibers does not appreciably add to the thickness of the screen, though both sides of the screen appear to be completely covered with the septum. Though, it will be readily recognized that precise measurements of the thickness of the septum are impossible it is found that the septum on either side of the screen generally does not exceed 0.005 in. in thickness.

EXAMPLE 2

A diluted suspensoid of Teflon$^R$ T-30 PTFE is vigorously mixed as described in the foregoing example, and maintained at about 50°C.

A batt of glass wool having individual glass fibers with diameters in the range from about 100 $\mu$ to about 1000 $\mu$ is wadded into a Buchner funnel and the diluted suspensoid is repeatedly flowed through the batt until flow of the liquid is essentially stopped because of PTFE fibers randomly deposited thereon.

The batt is removed from the funnel and dried in a stream of sterile, pure air to remove moisture at a temperature of about 120°C. Examination of the batt under a high power microscope reveals a network of fibers of PTFE intertwined randomly with the glass fibers and with each other forming a septum of PTFE fibers supported on the glass fibers. The septum is formed primarily near the receiving surface of the batt through which the diluted suspensoid is poured.

EXAMPLE 3

The screen coated with a septum of PTFE fibers formed as described in Example 1 hereinabove is placed in the path of a gas in which fine particles of antimony oxide are suspended. The particles are in the size range from about 0.1 $\mu$ to about 5 $\mu$, and the temperature of the gas is about 150°C; in no event is the temperature permitted to rise above 300°C. The lower limit of operation may be well below 0°C since low process temperatures normally encountered, up to about −50°C, do not appear to adversely affect the performance of the septum.

The screen is removed from the gas stream after about 1 hour and examined under a high power microscope. The septum of PTFE fibers is seen to loosely hold a large number of particles which have been separated from the gas stream.

EXAMPLE 4

The batt of glass fiber coated with a septum of PTFE fibers are described in Example 2 hereinabove is placed in a tube through which ambient air from the room is flowed for 1 hour. After the air is flowed through the batt it is led over a plate of nitrient agar sealed from contamination from the atmosphere. After the flow of air is stopped, the batt is leached with distilled water and a portion of the water so obtained is cultured. It is found that microorganisms normally present in the atmosphere are grown in the culture indicating that these organisms were trapped in the batt. The nutrient agar plate, over which air filtered through the batt is passed, shows no growth of organisms indicating all the organisms were removed by the batt.

EXAMPLE 5

A stack gas containing ash and a variety of metal oxides in a wide range of particle size is passed through a cyclone in which substantially all particles greater than 200 mesh are removed, and then through a Cottrell precipitator in which substantially all particles greater than 5 $\mu$ in diameter are removed. The effluent from the Cottrell precipitator is introduced into an elongated chamber about 20 ft. long, the walls of which are maintained at a temperature in the range from about 200°C to about 300°C depending upon the temperature of the dispersoid leaving the precipitator. The flow rate in the chamber is maintained at a gas velocity of about 5 ft./sec. at approximately atmospheric pressure. An aqueous suspersoid of T-30 Teflon is introduced into the chamber near the inlet, in an amount approximately about 1 percent, by weight, based on the estimated weight of total solids in the gas. The effluent from the chamber is led to a plenum lossely packed with steel wool having fibers in the range from about 0.005 in. to about 0.010 in, in diameter. The effluent from the plenum is monitored for solids content with a Sinclair-Phoenix forward scattering photometer which measured the intensity of light scattered by the particles of zinc sulfide. For a given size distribution the intensity of the scattered light is proportional to the concentration of particles. The introduction of T-30 Teflon is discontinued after about 1 hour, as is the flow of gas into the plenum. The steel wool is removed from the plenum and examined under a high power microscope. It is found that a septum of PTFE fibers is deposited on the steel wool, and solid particles are entrapped in the septum. Though, initially solid particles of the dispersoid are observed in the effluent from the plenum, there are essentially no observable fine particles near the end of the hour, indicating that the septum of PTFE fibers effectively removes the particles. Pressure drop measurements indicate that the pressure drop through the plenum at the end of the run is only slightly higher than that at the beginning.

EXAMPLE 6

25 gms. of Celutate Yellow Disperse Dye are placed in a mortar and 0.375g. Teflon T-6 fibrillatable PTFE fine powder was added. The mixture was heated under an infra-red heat lamp for about 10 minutes and then slowly worked with a pestle, using a smearing and masticating action to develop a cohesive mass.

This cohesive mass was dispersed in 1 liter of warm water and stirred until the mass was thoroughly dispersed. The liter of disperse dye was then poured repeatedly through a 40 mesh screen, until the rate of flow through the screen was noticeably slower than at the outset. The screen is then dried and examined under a microscope. It is seen that a network of PTFE fibers is deposited on the screen, including a large number of dye particles which are entrapped by the network of PTFE fibers.

The foregoing procedure is repeated using 1.5% by weight Teflon T-30 PTFE particles dispersed in an aqueous medium, and also repeated with an equivalent solid PTFE content of paste polymer. In each instance a network of fibers of PTFE is deposited on a screen.

EXAMPLE 7

25 gms. of Blue 8 GLN dye containing 0.75% PTFE solids, added in the form of a Teflon T-30 PTFE aqueous suspensoid, are heated in a mortar under an infrared heat lamp for about 20 minutes. The warm mixture is then worked with a pestle using a smearing and masticating action, until a cohesive mass is formed.

The cohesive mass is then added to 1 liter of warm water and stirred for 30 minutes to ensure that all the dye is dissolved. The solution is flowed repeatedly through a 100 mesh screen until flow of the solution through the screen is very slow. The screen is removed, dried and examined under a microscope. It is seen that a network of fibers of PTFE is formed on the screen.

In an analogous manner a network of fibers is deposited on screens using PTFE paste polymer to form a cohesive mass of dissolvable dye.

EXAMPLE 8

A dispersion of PTFE particles containing 60 percent by weight solids is diluted to 50 percent by weight with ethanol and poured into a Waring blender. Mixing is commenced at about 40°C and as soon as the contents appear to thicken, a small amount of additional diluent ethanol is added. Again mixing is commenced at about 40°C and again diluent is added when the mass appears to thicken. This procedure is continued, pouring off excess liquid when the blender is filled, until an essentially alcoholic cloudy liquid is left in the blender, substantially free of agglomerates large enough to be visible to the naked eye. This cloudy liquid is poured repeatedly through a section of 100 mesh screen as described in Example 1 et seq. until flow of alcohol is substantially impeded. The screen is dried and examined under a microscope. It is seen that a network of fibers, essentially invisible to the naked eye, is deposited on the screen.

Modifications, changes, and improvements to the preferred forms of the invention herein disclosed, described, and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

What is claimed is:

1. A filter comprising a gas-permeable support means and a network of unsintered fibers of fibrillated polytetrafluoroethylene having a diameter of less than 1 $\mu$ deposited upon said support means in a septum of said fibers in random overlying interrelationship to separate particles from a gaseous medium in which said particles are carried.

2. The filter of claim 1 wherein the fibers are generated at a temperature above the fibrillation temperature of said fibrillatable polytetrafluoroethylene, but below its sinter temperature.

3. The filter of claim 1 wherein said gas-permeable support means is a batt of fibers.

4. The filter of claim 1 wherein said gas permeable support means is a woven screen.

5. The filter of claim 1 wherein said gas-permeable support means is a ceramic open-pore filter.

* * * * *